(12) United States Patent
Douxchamps et al.

(10) Patent No.: US 9,803,860 B2
(45) Date of Patent: Oct. 31, 2017

(54) OXYGEN HEAT EXCHANGER

(71) Applicants: AGC GLASS EUROPE, Brussels (BE); L'Air Liquide Societe Anonyme Pour l'Etude Et l'Exploitation des Procedes Georges Claude, Paris (FR)

(72) Inventors: Olivier Douxchamps, Jumet (BE); Eric Baudelet, Jumet (BE); Bertrand Leroux, Paris (FR); Gabriel Constantin, Paris (FR); Remi Tsiava, Paris (FR); Bruno Symoens, Jumet (BE)

(73) Assignees: AGC GLASS EUROPE, Brussels (BE); L'Air Liquide Societe Anonyme Pour l'Etude Et l'Exploitation des Procedes Georges Claude, Paris (FR)

(*) Notice: Subject to any disclaimer, the term of this patent is extended or adjusted under 35 U.S.C. 154(b) by 40 days.

(21) Appl. No.: 13/730,727

(22) Filed: Dec. 28, 2012

(65) Prior Publication Data
US 2013/0115562 A1    May 9, 2013

Related U.S. Application Data

(62) Division of application No. 12/599,580, filed as application No. PCT/EP2008/055615 on May 7, 2008, now abandoned.

(30) Foreign Application Priority Data

May 10, 2007    (EP) .................................... 07107942

(51) Int. Cl.
C03B 11/08    (2006.01)
F23L 15/04    (2006.01)
(Continued)

(52) U.S. Cl.
CPC ............ *F23L 15/04* (2013.01); *C03B 5/2353* (2013.01); *F28D 7/16* (2013.01); *F28F 21/08* (2013.01); *Y02E 20/344* (2013.01); *Y02P 40/55* (2015.11)

(58) Field of Classification Search
CPC . F28F 19/00; F28F 21/08; F23L 15/04; F23L 15/045; F28D 7/16; C03B 5/2353; Y02E 20/344; Y02P 40/55
(Continued)

(56) References Cited

U.S. PATENT DOCUMENTS 3,721,291 A * 3/1973 Massaro et al. ............... 165/158
4,505,879 A    3/1985 Lhonore et al.
(Continued)

FOREIGN PATENT DOCUMENTS

EP    0 068 057    1/1983
EP    0 650 934    5/1995
(Continued)

OTHER PUBLICATIONS

Material Data Sheet for Inconel, Hydra, retrieved from: http://www.witzenmann.de/download/Manual%20of%2metaa%20bellows_0441e%20S%20174-199_2_04_10_20_web.pdf.*
(Continued)

*Primary Examiner* — Michael H Wilson
*Assistant Examiner* — Yana B Krinker
(74) *Attorney, Agent, or Firm* — Oblon, McClelland, Maier & Neustadt, L.L.P.

(57) ABSTRACT

The present invention relates to a heat exchanger for the supply of oxygen or of a gas mixture containing at least 50% oxygen, the temperature at the outlet of the exchanger not being below 300° C., it preferably being above 400° C., the oxygen or the oxygen-rich gas feeding one or more burners of a glass melting furnace, the heat of the combustion gases
(Continued)

being used directly or indirectly to heat the oxygen or the oxygen-rich gas in the exchanger, in which the exchange power is between 20 and 300 kW, preferably between 40 and 250 kW and particularly preferably between 80 and 170 kW.

28 Claims, 1 Drawing Sheet

(51) Int. Cl.
    *F28D 7/16*     (2006.01)
    *F28F 21/08*     (2006.01)
    *C03B 5/235*     (2006.01)

(58) Field of Classification Search
    USPC ......... 65/374.1; 165/64, 108, 168, 169, 170, 165/171, 172, 173, 174, 175, 176, 177, 165/179
    See application file for complete search history.

(56) References Cited

U.S. PATENT DOCUMENTS

| | | | |
|---|---|---|---|
| 4,518,811 A * | 5/1985 | Lhonore et al. | 568/943 |
| 4,816,056 A * | 3/1989 | Tsai et al. | 65/134.4 |
| 4,858,681 A * | 8/1989 | Sulzberger | 165/70 |
| 5,196,632 A * | 3/1993 | Larsen et al. | 585/440 |
| 5,269,834 A * | 12/1993 | Dotson et al. | 95/104 |
| 5,560,758 A * | 10/1996 | Brown et al. | 65/134.4 |
| 5,655,464 A | 8/1997 | Moreau et al. | |
| 5,807,418 A * | 9/1998 | Chamberland et al. | 65/134.4 |
| 6,071,116 A * | 6/2000 | Philippe et al. | 432/29 |
| 6,250,916 B1 | 6/2001 | Phillippe et al. | |
| 6,253,578 B1 | 7/2001 | Kobayashi et al. | |
| 6,273,180 B1 * | 8/2001 | Joshi et al. | 165/11.1 |
| 6,519,973 B1 | 2/2003 | Hoke, Jr. et al. | |
| 6,524,097 B2 | 2/2003 | Hoke, Jr. et al. | |
| 6,620,969 B1 * | 9/2003 | Nishimura et al. | 562/600 |
| 2004/0241086 A1 | 12/2004 | Van Dongen et al. | |
| 2004/0262579 A1 | 12/2004 | Van Dongen et al. | |
| 2007/0281254 A1 | 12/2007 | Leroux et al. | |
| 2011/0016923 A1 | 1/2011 | Douxchamps et al. | |
| 2011/0017195 A1 | 1/2011 | Douxchamps et al. | |

FOREIGN PATENT DOCUMENTS

| | | |
|---|---|---|
| EP | 0 801 035 | 10/1997 |
| EP | 0 872 690 | 10/1998 |
| EP | 1 094 273 | 4/2001 |
| EP | 1 136 451 | 9/2001 |
| FR | 2 863 690 | 6/2005 |
| JP | 2000 254484 | 9/2000 |

OTHER PUBLICATIONS

Bott, T. Reg, To Foul or Not to Foul That is the Question, Chemical Engineering Progress Magazine, Nov. 2001, pp. 30-37, Retrieved on Oct. 28, 2014, Retrieved from: www.clarkson.edu/~wilcox/Design/hxfoul.pdf.*
Lievre, K., et al., "Recent developments in oxy-fuel firing for glass melters," Glass Industry, Glass Industry Magazine, vol. 82, No. 3, pp. 25-31, (Mar. 1, 2001).
International Search Report issued Sep. 10, 2009 in PCT/EP09/056843 filed Jun. 4, 2009.
Ruiz, R. et al., "Oxy-Fuel Furnace Design Considerations", Glass Industry, vol. 76, No. 6, pp. 10, 13-14, 19-20 and 23, XP 000506664, ISSN: 0017-1026, (May 1, 1995).
Wu, K. T. et al., "Design Modeling of Glass Furnace Oxy-Fuel Conversion Using Three-Dimensional Combustion Models", Ceramic Engineering and Science Proceedings, vol. 17, No. 2, pp. 132-141, XP000622573, ISSN: 0196-6219, (Jan. 1, 1996).
International Search Report issued Jun. 10, 2009 in PCT/EP09/053506 filed Mar. 25, 2009.
International Search Report issued Jun. 4, 2009 in PCT/EP09/53500 filed Mar. 25, 2009.
International Search Report issued Jun. 5, 2009, in PCT/EP09/053518 filed Mar. 25, 2009.
International Search Report issued Jun. 5, 2009 in PCT/EP09/53522 filed Mar. 25, 2009.
Kobayashi, Hisashi et al., "Advances in Oxy-Fuel Fired Glass Melting Technology", Proceedings of International Congress on Glass, pp. 1-17, XP002496632, (2004).
Joseph R. Davis, "Elevated-Temperature Corrosion Properties of Superalloys" ASM Internationl Handbook Committee ASM International, 1997, retrieved from: http//books.google.com/books?id=GEHA8-bix0oC&pg=PA28888&dq=Elevated-Temperature+Corrosion+Properties+of+Superallows%22+ASM+International+Handbook+Committee+ASM+International+1997.
Material Data Sheets for Inconel, Hydra, retrieved from: http//www.witzenmann.de/download/Manual%20of%20metal%20bellows_0441e%20S%20174-199_2_04_10_20web.pdf, Feb. 16, 2012.

* cited by examiner

Fig. 1
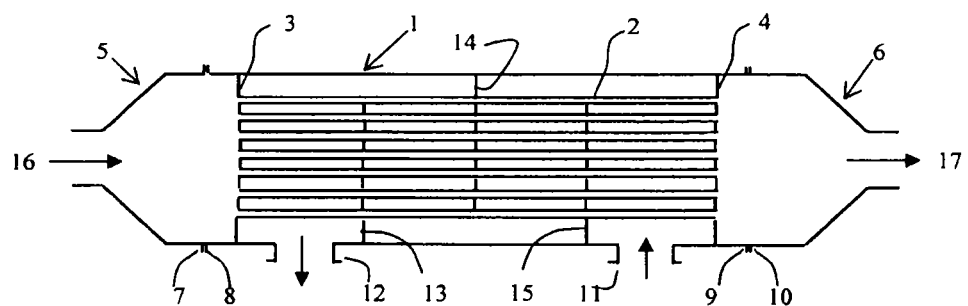
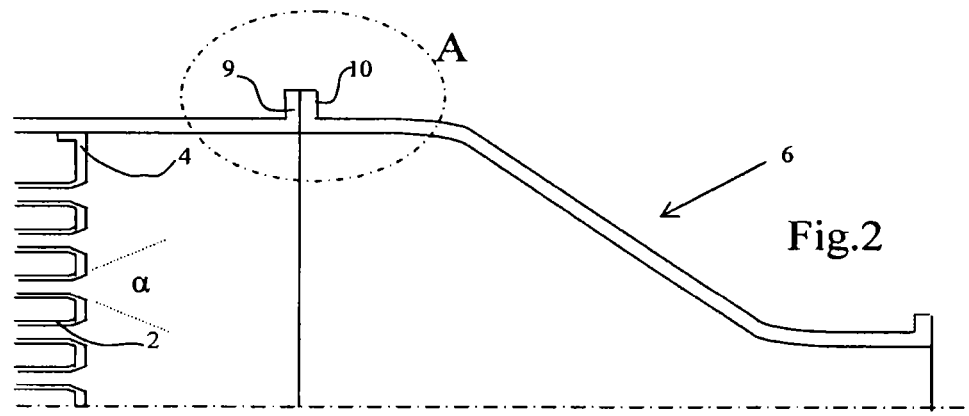
Fig.2
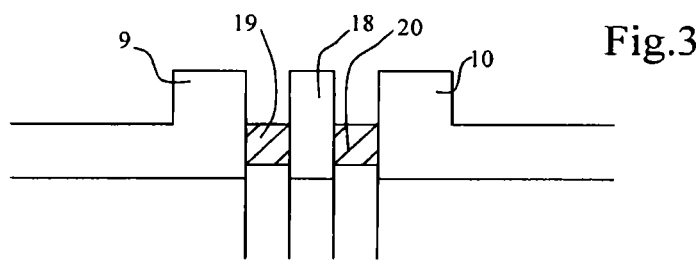
Fig.3

OXYGEN HEAT EXCHANGER

This application is a continuation of U.S. Ser. No. 12/599,580 filed Jun. 26, 2010, pending, which is a 371 application of PCT.EP08/55615 filed May 7, 2008 and claims the benefit of EP07107942.0 filed May 5, 2010. The contents of each of these applications are incorporated herein by reference in their entirety.

The present invention relates to heat exchangers intended to heat oxygen or a gas rich in oxygen for the purpose of supplying the burners of glass melting furnaces.

Glass melting furnaces, including those with the highest production capacity, i.e. the furnaces supplying the "floats" producing flat glass, are mostly equipped with burners that operate with fossil fuels and air. The choice of this type of energy is driven by economic reasons, considering the importance of energy consumption. As an indication, usual melting furnaces producing between 600 and 900 tonnes of glass per day require an available power in the order of 50 to 80 megawatts.

The use of these furnaces not only results in a significant energy consumption but also in the discharge of large volumes of combustion gas. For these reasons, efforts are constantly being made to reduce energy costs and the costs for processing these combustion gases as far as possible.

The currently most widespread practice using air as combustive does not lead to the lowest possible consumption of energy, since nitrogen in the air is also brought to high temperature and consequently absorbs a significant portion of the energy released by combustion, and part of this energy is lost even if the fumes undergo a recovery operation. Moreover, as is well known, the presence of nitrogen leads to the formation of the oxides responsible for so-called acid rain.

For these reasons solutions that use not only air but oxygen or gases rich in oxygen have been developed and are already being used in some applications.

However, the systematic use of oxygen encounters practical and economic difficulties. The costs of the oxygen required is the first of the economic difficulties. The energy balance gain must more than compensate the additional cost of the oxygen. The investments in specific material are also of importance in the economics of the system, whether it concerns the burners, supplies or, as studied below, the exchangers. In practice, the continuous supply of oxygen to these large-scale assemblies requires production installations on site or supply via gas pipeline, either of which incurring substantial investments.

Considering the burdens imposed by the use of oxygen or gas rich in oxygen in these glass melting furnaces to reach a satisfactory economic balance, it is necessary to optimise the choices made.

It appears that the best energy balance requires that burners are run using oxygen and preheated fuels, with at least part of the combustion gases being used for this preheating operation.

While the use of hot oxygen is highly recommendable, putting this into practice requires new solutions both for the configuration of these installations and for their operation. Thus, traditionally, the air used for the burners is preheated in regenerators. These are towers lined with refractory materials, into which the combustion gases are passed to heat the refractory materials in a first phase and into which the air used in the combustion is passed for reheating in a second phase. The alternation of these phases results in a highly specific furnace structure. The burners are thus on either side of the melting bath as are the regenerators associated with them that are generally located on the opposite side to the active burners.

It is not possible to use regenerators to reheat the oxygen. Generators are commonly the receptacle for deposits of particles carried by the combustion gases, even if these have been subjected to a dust removal operation beforehand. Contact of the hot oxygen with these deposits is not without risk. Moreover, it is difficult to guarantee a perfect seal of these regenerators. The passage of air and possible leaks are not dangerous, but this is not the case with respect to oxygen.

The use of heat exchangers also raises sensitive problems of resistance of the materials to contact with hot oxygen. In view of these difficulties and taking into account economic constraints, the use of hot oxygen has not found significant application in large installations such as those for large-capacity glass melting furnaces.

Therefore, the aim of the invention is to propose solutions that encourage the use of oxygen or hot gases rich in oxygen in the burners of glass melting furnaces, and in particular in large-capacity furnaces. The invention also proposes to provide solutions that make this use sufficiently safe despite the special technical requirements associated with the use of oxygen at high temperature.

Since the risks associated with the use of oxygen occur in the installation from the instant the temperature increases, the inventors have directed all their attention to the devices in contact with this hot oxygen and in particular to the exchangers, which contain significant quantities of this oxygen and whose construction must allow operation without failure for very long periods, because of the difficulties raised by any intervention for maintenance or repairs.

The above considerations relating to the use of hot oxygen also apply to gas mixtures, in particular with air, in which the oxygen content is sufficiently high. In practice, for these gas mixtures to remain advantageous in use, their oxygen content should not be less than 50%. This condition applies to the invention presented below. The invention preferably applies to gas mixtures with an oxygen content of at least 80%.

According to the invention, the heating of oxygen or gas rich in oxygen for supplying the burners of the furnace is conducted in exchangers, in which the exchange power is deliberately reduced without minimising the temperature to which the oxygen or gas rich in oxygen is brought.

To sufficiently benefit the advantage for the energy balance, the temperature of the oxygen or gas rich in oxygen at the outlet of the exchanger is not less than 300° C. and preferably not less than 400° C., and the power exchanged in the exchanger to bring the oxygen to these temperatures according to the invention lies between 20 and 300 kW, preferably between 40 and 250 kW and particularly preferred between 80 and 170 kW.

Power levels lower than those recommended are not economical and impair the competitiveness of the system. Higher power levels are likely to lead to difficulties with respect to convenience and, above all, the safety of use of these exchangers.

In traditional glass melting furnaces, at least those of large capacity, the burners used generate significant power levels in the order of 1 to 6 MW resulting in an oxygen consumption in the order of 200 to 1200 $Nm^3$ of oxygen per hour.

In view of the power, and therefore consumption of each of the burners typically used in these furnaces, the exchangers according to the invention are only associated with a small number of burners. Each exchanger advantageously only supplies at most three separate burners simultaneously with hot oxygen or gas rich in oxygen, wherein each burner can have several injection nozzles, depending on the specifications, such as those presented, for example, in EP 1 194 719.

This arrangement that leads to an increase in numbers of exchangers assures an improved safety of the installation by limiting the dimensions and capacity of each exchanger, but also significantly limiting the length of the ducts downstream of the exchangers that lead to the burners.

In order to remain advantageous from the economic viewpoint, the use of exchangers according to the invention must preferably result in limited dimensions, which involves a quite specific mode of operation and in particular allows the required power to be generated while also keeping the exchange area as small as possible.

According to the invention the exchangers for heating the oxygen or gas rich in oxygen advantageously have a power per unit area of contact of the oxygen with the exchange walls in the range of between 5 and 15 $kW/m^2$, and preferably between 7 and 12 $kW/m^2$. The area in question is that of the wall separating the oxygen or gas rich in oxygen from the heat transfer gas.

The construction of the exchangers used according to the invention must provide as simple a structure as possible to prevent risks of erosion and leakage as a result of the aggressiveness of hot oxygen towards materials used. For convenience, the exchangers according to the invention are preferably tubular, wherein the oxygen or gas rich in oxygen circulates in a bank of tubes with the heat transfer gas circulating on the outside of these.

To guarantee the power levels indicated above, and in particular the power levels per unit area, while keeping these areas as small as possible, it is necessary to optimise the heat exchange conditions.

A first way to benefit this exchange consists of increasing the circulation rate of the gases and in particular the oxygen or gas rich in oxygen. However, from this viewpoint it is necessary once again to take into account that the increase in circulation rate is a risk factor. The risk is all the more significant as hot oxygen is likely to entrain particles that can react with the oxygen and/or whose impact on the walls promotes rapid erosion in addition to that resulting from the friction of the oxygen itself.

In order to take this risk into account, according to the invention the dimensions of the elements of the exchanger are advantageously defined so that in order to obtain the necessary power level, the circulation rate of the oxygen or gas rich in oxygen is not higher than 120 m/s at any point in the exchanger, and preferably is not higher than 100 m/s.

Besides the temperature and circulation rate of the oxygen, it is known that the risk of ignition in particular is also dependent on pressure. If an increase in pressure leads to a reduction in volume and therefore in the circulation rate in the exchanger, a modification of this type is also dependent on the operating characteristics of the burners that can be used in the furnaces in question. In practice, it is a very delicate matter to proceed towards a pressure reduction of the hot oxygen after passage into the exchanger and before it reaches the burner. Because of its nature, it does not reliably allow passage into pressure reducing means, and even the use of diaphragms to conduct this operation is not recommended, both as a result of its aggressiveness. A high pressure at the level of the injection nozzle or nozzles of the burner to maintain an adequate delivery rate would result in the opening of this or these nozzles to be reduced. This is not desirable because of the risk of fouling and/or wear of these nozzles, which would quickly lead to defective operation.

To take these factors into account, the exchangers according to the invention are also dimensioned such that for the power levels sought, the pressure of the oxygen or gas rich in oxygen in the exchanger does not exceed 3 bar, preferably not 2 bar and particularly preferred 1.5 bar.

Studies of the operating specifications of these installations show that the best energy balances require that the fuels and oxygen carriers are brought to an elevated temperature. The temperatures to which the gases must be brought are as elevated as the installations used permit.

While it is advantageous from the point of view of efficiency of the burners to bring the oxygen to the most elevated temperatures, these are limited in practice by the temperature of the heat transfer fluid taking part in the exchange as well as by the need to limit the risk of corrosion or even ignition of the materials in contact with the oxygen.

The energy supply to heat the oxygen or gas rich in oxygen comes from the combustion gases either directly by circulation in the exchanger or preferably indirectly by means of a fluid that has itself been reheated beforehand by an exchange with the combustion gases.

This latter manner of proceeding provides additional safety in the case of deficient tightness in the circulation of the oxygen. Rapid fouling of the exchanger can also be prevented as a result, since the combustion gases entrain a significant quantity of dust with them that it is difficult to separate completely.

The intermediate gas, should such a double exchange occur, is advantageously inert with respect to oxygen. This is preferably air, nitrogen, $CO_2$, steam or a mixture of these gases.

If necessary, the intermediate gas can be formed from a mixture of the inert gases indicated above and a portion of the combustion gases that have undergone dust separation beforehand.

The temperature of the fumes can increase to 1550° C. and most frequently lies between 1250° and 1450° C. and is higher than the temperatures, to which oxygen can be brought without too severely degrading the material of the walls with which it comes into contact.

In the case of an installation comprising a double exchange, in which the heat transfer fluid is formed from air, the temperature of this latter after being reheated by the combustion gases is preferably in the range of between 450° and 1000° C. and particularly preferred between 600° and 800° C.

As clearly evident from the studies of the inventors, which form the subject of the tests outlined below, the corrosion of the materials forming the heat exchanger increases rapidly with the temperature such that it is preferable to keep the oxygen in conditions that ensure against excessive corrosion.

In practice, the temperature of the hot oxygen or gases rich in oxygen as results from the heat exchanges remains within the limits where the choice of materials made according to the invention can prevent excessive corrosion of the installation. This temperature does not ordinarily exceed 900° C. and preferably is not higher than 700° C.

The materials forming the exchanger, and primarily those in contact with the hot oxygen, must be selected in order to assure a good resistance to oxidation by the gases and in particular the oxygen in these temperature conditions.

The steels most commonly used are not sufficiently resistant. Consequently, it is necessary to make a particularly careful selection in order to guarantee long service life of the installation.

The selection of materials not only includes consideration of resistance to the highest temperatures reached in these installations, but also a good resistance to temperatures that are lower, but are also known to cause a change in state of the material which will make it particularly sensitive to possible degradations. During an increase in temperature, some steels in particular pass through transition temperature zones that will cause embrittlement of the metal.

There are several aspects to the desired resistance. It is not just a matter of preventing vigorous oxidation of the materials in the form of their combustion, it is also a matter of preventing any modification of the surface in contact with the oxygen, which can eventually not only lead to perforation of the walls but much more, it is advisable in some cases to prevent the detachment of particles that are likely to disturb the subsequent reaction and/or pollute the products prepared by means of the combustion maintained with this hot oxygen.

In all cases, the installation in which the gases rich in oxygen circulate must be made from materials that naturally provide the desired resistance to these gases that are particularly aggressive by nature, and all the more so when the temperature, circulation rate and pressure are more elevated.

So that the exchanger used to heat the oxygen or gas rich in oxygen can meet the conditions of use outlined above in a lasting manner, the inventors have established characteristics that the materials forming them must meet.

In general, according to the invention the exchanger that must receive gases containing at least 50% oxygen at a temperature not less than 300° C. is made, at least in the case of the walls directly in contact with these gases, of a metal alloy that complies with the following test protocol.

A sample of metal alloy according to the invention placed in an atmosphere corresponding to the gas rich in oxygen that has to circulate in the installation and at the most elevated temperature encountered in the installation does not exhibit a weight gain of more than 0.1 mg/cm$^2$ of surface exposed after 1000 cycles each including maintaining the anticipated maximum temperature for 1 hour, each phase at this temperature being followed by a return to ambient temperature.

The choice of repeated passage through the elevated temperatures followed by a return to ambient temperature is particularly exacting. The structures of the metal can encounter repeated phase modifications in particular that cause the highest stresses, and therefore increased risks of degradation. In practice, this test is such that it subjects the metal to more significant trials than those withstood during use of the industrial exchanger itself, which is intended to operate continuously, this operation only being interrupted occasionally for maintenance operations at the longest possible time intervals.

As indicated above, since the burners of the glass furnaces are preferably supplied with a gas with an oxygen content that is preferably higher than 80% and can reach 100%, the test indicated above must advantageously be passed for these oxygen contents.

To best assure a long service life of the exchanger, the chosen metal alloy goes through the same test, but here the control temperature is at least 500° C., and to meet the envisaged extreme conditions, the alloy went through the test in which the most elevated test temperature is at least 600° C., and can pass this test even at temperatures of 800° C.

In addition, in a test for spontaneous combustion in an oxidising atmosphere in accordance with standard ASTM G-124, the alloys most suitable for forming the exchanger according to the invention resist this combustion at least up to pressures of 3 bar and preferably at least up to pressures of 10 bar.

Those alloys advantageously used and having a positive response to the corrosion test when used in temperature ranges above 550° C. include ferritic type non-oxidising alloys, in which the Cr content is in the range of between 12 and 30% by weight and which simultaneously contain Al at the rate of 1 to 8%.

Ferritic alloys are subject to embrittlement when in temperature ranges between 400° and 500° C. For these reasons, the use of these alloys must take into account the considered factors and conditions, in particular temperature conditions, prevailing in the exchanger.

The parts of the exchanger exposed to hot oxygen can also be made from alloys rich in Ni and Cr having Ni contents higher than 25% by weight and simultaneously containing 10 to 30% Cr. The Ni content can rise to 75% or more.

These alloys differ from one another in particular in their mechanical properties. Moreover, their selection must possibly take into account any limitations specific to the envisaged use. While alloys with a high Ni content work well in flat glass production installations, it is important to take into consideration the risk posed by the presence of Ni, as any entrainment of particles by the Ni must be carefully avoided because of the risk of nickel sulphide forming in the glass sheets that generates fractures.

These alloys have a good resistance to corrosion at elevated temperature due to the formation of a protective film of chromium or aluminium oxide. The chromium content of the alloy must be sufficiently high in order to prevent the formation of nickel oxide nodules that increase rapidly and, if entrained, would be capable of forming nickel sulphide in the glass sheets that generates fractures.

With oxygen temperature ranges higher than 500° C., and in particular between 500° and 700° C., it is preferable to use alloys in which the chromium content is only 10 to 20%, particularly preferred between 10 and 16%. Alloys rich in Ni that meet the specified requirements are in particular those usually referred to by the names Inconel 600H, 600L, Incoloy 800H.

With oxygen temperature ranges higher than 100° C., and in particular between 100° and 600° C., it is preferable to use alloys in which the chromium content is higher than 16%, particularly preferred between 20 and 30%. Alloys rich in Ni that meet the specified requirements are in particular those to usually referred to by the names Inconel 600H, 600L, 601, 617, 625, Incoloy 800H and 800HT.

It is also possible to use an alloy such as stainless steels 316L and 310, which are easy to work, but whose service life is less assured.

While the circulation rate of the highly oxidising gases at elevated temperature is a risk factor with respect to erosion, this can be increased by particles carried by these gases. Initially, the gases are substantially free of solid particles, but these can come from the installation itself. The walls of the ducts and the heat exchangers exposed to corrosion by these gases can in fact release particles, which as they impact the elements downstream also generate erosion and to a much higher degree, as the flow rate of the gases increases.

The surface condition of the walls of the exchanger can affect the resistance to corrosion. The more pronounced the surface irregularities are, the more the alloy is corroded with otherwise identical conditions. For this reason, the surfaces of the walls of the exchanger according to the invention that come into contact with the gases rich in oxygen are polished and have a roughness of not more than 6 Micrometers (μ). The roughness is preferably less than 4μ and most advantageously is at most equal to 2μ.

Examples of practical details of the invention are given in the description below with reference to the set of drawings:

FIG. 1 is a schematic sectional illustration of a gas exchanger usable according to the invention to reheat oxygen or gas rich in oxygen;

FIG. 2 is a partially enlarged view of the end of the exchanger shown in FIG. 1;

FIG. 3 shows a detail of part-section A taken from FIG. 2.

The general structure of the exchanger is the conventional type for gas exchangers. It comprises a chamber 1 enclosing a bank of tubes 2. The tubes are secured inside the chamber by plates 3, 4.

The plates form a sealed wall delimiting the zone of the chamber 1, in which the heat transfer gas circulates.

The chamber is closed at its ends by two covers 5, 6. These covers are tightly secured to the chamber by means of flanges 7, 8, 9, 10 and seals. These flanges can be removed to give access to the ends of the tubes 2, where necessary.

To obtain the best possible exchange, the circulation of the heat transfer gas and the oxygen or gas rich in oxygen is advantageously conducted in reverse flow. The hot heat transfer gas passes into the chamber through conduit 11 and exits through conduit 12 after having passed through the circuit created by the baffles 13, 14, 15 inside the chamber.

The oxygen or gas rich in oxygen circulates in the tubes 2 along a substantially rectilinear course. It passes cold through end 16 and exits hot at end 17 to be conducted to the burners.

The exchange is all the more effective when circulation rates are higher. Nevertheless, the flow rate and pressure of the oxygen must be held within the limits that assure the operating safety of the device. The circulation of the oxygen must be prevented from resulting in excessive corrosion of the walls which it comes into contact with. It should also be ensured that the oxygen does not strike the walls. The use of rectilinear tubes thus restricts erosion.

The arrangement of the ends of the tubes 2 is shown in detail in FIG. 2.

To prevent turbulence at the ends of the tubes, with the risks of increased erosion at the point where these tubes connect to the plate 4 most frequently by suitable welds, these tubes terminate with a widened section. This arrangement facilitates the flow of oxygen and its expansion and subsequently some deceleration. This widening is in the shape of a truncated cone in the figure with an angle of opening α.

For the same reason, the covers, and above all cover 6 arranged at the oxygen outlet, are located at a distance from the ends of the tubes 2. In this way, the flow rate of the oxygen along the walls of the cover is substantially reduced in relation to that at the outlet of the tubes.

The general shape of this cover 6 is also chosen so that the advance of the hot oxygen encounters the wall of the cover at a low incidence, thus minimising impact. For example, the wall of the cover is at an angle of about 20 to 30 degrees relative to the direction of the tubes 2. The profile of the cover decreases progressively up to the connection with the outlet duct.

It is also advantageous to ensure that there are no sharp angles or welds in this section.

The dimensioning of the tubes and their distribution are such that the flow rate and pressure conditions indicated above are met by the delivery rates implemented.

Since the exchanger must operate continuously over very long periods, it may eventuate that a tube no longer has the necessary tightness in spite of precautions taken to prevent wear of the elements of the exchanger. The assembly of the exchanger is such that the defective tube can be blocked at these two ends. The operation requires that the covers be removed. After the defective tube has been taken out of service, the exchanger is once again usable with an efficiency that is little changed in proportion to the remaining active tubes.

The tightness at the level of the flanges of the covers 9, 10 of the exchanger or at the connection of these covers with the oxygen intake or outlet ducts is advantageously obtained by means of a metal annular seal 18 lined with a material 19, 20 resistant to oxygen. The material in question is mica or a compressible mineral material, for example. Seals of this type are produced in particular by Garlock under the brand name "Vitaflex".

In order to determine the alloys that comply with the implementation conditions according to the invention, the inventors have conducted tests that are discussed in the following description.

For these tests, the samples are formed from 2 mm thick plates of metal alloy measuring 20×20 mm.

The condition of the surface of the samples indicates its clear importance with respect to sensitivity to oxidation. For this reason, one face of each of these plates is polished with an abrasive sheet of SiC to grain size 1200. The other face is left in its original state as produced by the industrial rolling process.

The composition by weight of the samples of alloys tested is specified in the following table:

| Alloy | Fe   | C     | Si   | Cr    | Al       | Ni    | Mn   | Others                |
|-------|------|-------|------|-------|----------|-------|------|-----------------------|
| I     | 6-10 | 0.15  | 0.5  | 14-17 |          | 72    |      | 0.5 Cu                |
| II    | comp | <0.04 | <1.0 | 19-23 | 0.15-0.6 | 30-34 | <1.5 | 0.15-0.6 Cu           |
| III   | comp |       |      | 20    | 5.5      |       |      | 0.5 Ti 0.5 $Y_2O_3$   |
| IV    | comp | 1-2   |      | 24    | 1-2      |       |      |                       |
| V     | comp |       |      | 22    | 5        |       |      |                       |
| VI    | comp | 0.15  |      | 23-27 | <1.0     |       | 1.5  |                       |

The measurement of the oxidation of the samples is evaluated by the increase in their mass after testing over a thousand cycles. The results for different phase temperatures are indicated in the following table:

| | Alloy | | | | | |
|---|---|---|---|---|---|---|
| | I | | | V | | |
| | Temperature | | | | | |
| | 550 | 650 | 800 | 550 | 650 | 800 |
| mg/cm² | 0.013 | 0.06 | 0.347 | 0.004 | 0.02 | 0.099 |
| | Alloy | | | | | |
| | III | | | IV | | |
| | Temperature | | | | | |
| | 550 | 650 | 800 | 550 | 650 | 800 |
| mg/cm² | 0.097 | 0.10 | 0.232 | 0.026 | 0.05 | 0.103 |

It is evident from these tests that the oxidation is more significant when the phase temperature is higher. At 550° C.

the increase in all cases remains well below 0.1 mg/cm². At 650° C. only one sample reaches this value. At 800° C. the most resistant samples are those of alloys IV and V.

The metallographic observation of the samples shows a much lower tendency towards oxidation in the polished face of the samples.

The above measurements at the same time include the oxidation of the two faces of the sample. Since only one face is polished, the oxidation measurement obtained is thus higher than that which would be observed in practice when the surface in contact with the oxygen is polished.

Since the tests were conducted in a static manner, in other words without circulation of the atmosphere in relation to the sample, no "scale" appeared to have detached from the surface.

Analysis of the modification of the compositions at the surface, and in particular the decrease in Cr content, is a means of evaluating the risk of detachable particles forming. The presence of Cr with a content of not less than 7% guarantees the formation of a protective layer that prevents the formation of scale.

The measurements outlined in the following table show that the Cr content remains well above these values. After testing over 1000 cycles, in which the phases are at the maximum temperatures indicated, the analysis in percentage by weight of the samples at the surface (S) and at the core (C) of the product leads to the results indicated in the following table:

| Alloy | ° C. |   | Cr   | Si  | Al  | Fe   | Ti  | Mn  | Ni   |
|-------|------|---|------|-----|-----|------|-----|-----|------|
| III   | 800  | S | 17.9 |     | 6.3 | 72.7 | 0.4 | 0.1 |      |
|       |      | C | 19   |     | 5.6 | 73.6 | 0.5 | 0.0 |      |
| IV    | 800  | S | 22.1 | 0.8 | 2.1 | 72.1 | 0.0 | 0.4 |      |
|       |      | C | 23.1 | 0.8 | 1.9 | 71.9 | 0.3 | 0.4 |      |
| IV    | 550  | S | 18.6 | 0.7 | 1.8 | 75.8 | 0.0 | 0.3 |      |
|       |      | C | 23.7 | 0.8 | 1.9 | 71.8 | 0.0 | 0.4 |      |
| V     | 800  | S | 20   | 0.0 | 6.3 | 71.0 | 0.0 | 0.1 |      |
|       |      | C | 21.5 | 0.0 | 5.6 | 71.4 | 0.0 | 0.1 |      |
| I     | 800  | S | 10.9 | 0.2 |     | 8.8  |     |     | 79.5 |
|       |      | C | 15.7 | 0.2 |     | 7.9  |     |     | 75.5 |
| I     | 550  | S | 15.6 | 0.1 |     | 7.5  |     |     | 75   |
|       |      | C | 15.9 | 0.1 |     | 8.0  |     |     | 74.2 |

Considering the nature of the anticipated atmosphere, the use of materials must comply with strict safety conditions. The risk of combustion of the material brought to elevated temperature in the presence of pure oxygen is thus evaluated in accordance with the protocol of standard ASTM G 124.

In these tests, specimens of material placed in an atmosphere of oxygen under pressure are subjected to a combustion test. The results of these tests show that at 550° C. and at a pressure of 3 bar, combustion does not occur in any of the samples.

When the pressure or temperature is increased, the tendency towards combustion increases. Alloy III was found to be the most sensitive to this test.

In general, at the temperatures envisaged above, the pressure must not exceed 10 bar, whatever alloy is selected. On this condition, the test in accordance with the standard shows that use in supply installations for gas rich in oxygen does not cause any risk of combustion.

On the basis of the results of these tests for resistance to hot oxygen, a particularly interesting point appears to be that in an exchanger according to the invention the thickness of the walls can be relatively less thick than one would assume from the prior art. Longevity simulations based on these results lead to walls for the tubes of the exchangers according to the invention that have a thickness that can be no more than 3 mm. This thickness can even be equal to or less than 2.5 mm.

The relatively low thickness of the walls of the tubes of the exchanger benefits the heat transfer and therefore increases the available power for the same exchange area.

As an exemplary embodiment, an exchanger according to the invention is configured in the following manner. It is formed by a bank of 40 tubes of Inconel 600. The outside diameter of the tubes is 17.2 mm and the thickness of the wall is 2.3 mm. The tubes have a length of 4000 mm.

The exchange area in contact with the oxygen is therefore 8.4 m².

Coming from a first exchanger, the heat transfer gas (air with dust extracted) enters the exchanger at a temperature of 650° C. The delivery rate of the heat transfer gas is set at 750 Nm³/h. The delivery rate of oxygen is 400 Nm³/h. As it enters at ambient temperature the oxygen is heated to 550° C.

The flow rate of the oxygen in the ducts is 67 m/s and the load loss in the exchanger is less than 0.15 bar. A safety system comprising a pressure controller maintains the pressure in the exchanger at less than 1 bar.

The nominal power of the exchanger is 84 kW and per unit area is set at 9.7 kW/m².

The exchanger supplies a burner of a glass melting furnace with a power of 2 MW with oxygen.

The full furnace is supplied with oxygen by 10 similarly dimensioned exchangers. The power of each of these exchangers is adjusted to better distribute the total power necessary to operate the furnace.

The invention claimed is:

1. A process for supplying gas to one or more burners of a glass melting furnace, comprising:
   supplying combustion gases from the glass melting furnace to a first heat exchanger;
   effecting a first heat exchange using the combustion gases to heat an intermediate heat transfer gas that is inert with respect to oxygen to form a heated heat transfer gas in the first heat exchanger;
   supplying oxygen gas comprising oxygen or a gaseous mixture comprising at least 50% oxygen to a second heat exchanger having an outlet;
   effecting a second heat exchange by heating the oxygen gas in the second heat exchanger with the heated heat transfer gas to a temperature at the outlet of the exchanger of not less than 300° C. to form heated oxygen gas;
   supplying the heated oxygen gas from the outlet to one or more burners of the glass melting furnace;
   generating in each burner from 1 to 6 MW in the furnace;
   exchanging a power per unit area in contact with the oxygen or gas rich in oxygen in the second heat exchanger in the range of between 5 and 15 W/m²,
   circulating gas in the tubes carrying the oxygen gas at a rate that does not exceed 120 m/s at any point in the second heat exchanger;
   exchanging power in the second heat exchanger to heat the oxygen gas in a range of between 20 and 300 kW, and
   maintaining a pressure of the oxygen gas in the second heat exchanger below 3 bar,
   wherein both the first and second heat exchanges are indirect heat exchanges, and
   wherein surfaces of the second heat exchanger contacting the oxygen gas are polished to have a roughness that does not exceed 6 μm.

2. The process according to claim 1, wherein each second heat exchanger supplies heated oxygen gas to at most three burners of the furnace.

3. The process according to claim 1, further comprising:
circulating the oxygen gas in tubes in the second heat exchanger, and
contacting internal walls of the second heat exchanger with a heat transfer gas,
wherein the second heat exchanger has a tubular configuration.

4. The process according to claim 3, in which the tubes in which the oxygen gas circulates are substantially straight and walls of the tubes have a thickness that is not more than 3 mm.

5. The process according to claim 3, in which a chamber enclosing the tubes is formed from several elements joined by flanges, wherein tightness is assured at these flanges by composite seals, the sealing element of which is made of material that is inert with respect to oxygen.

6. The process according to claim 5, in which the sealing element is a ring composed of compressible mineral material.

7. The process according to claim 1, wherein a material of surfaces in contact with the oxygen gas in the second heat exchanger is made from a metal alloy of which a sample exposed to the oxygen gas does not exhibit a weight gain of more than 0.1 mg/cm$^2$ after 1000 cycles of exposure, wherein each cycle includes increasing the temperature of the oxygen gas to a value equal to or higher than 400° C., maintaining this phase temperature for one hour and returning to ambient temperature.

8. The process according to claim 7, in which the alloy complies with the condition of a weight gain of less than 0.1 mg/cm$^2$ of exposed surface when the phase temperature is at least 500° C. in oxidising atmosphere.

9. The process according to claim 7, in which the alloy in contact with the oxygen gas resists the spontaneous combustion test according to standard ASTM G 124 at least up to a pressure of 3 bar.

10. The process according to claim 7, in which the alloy in contact with the oxygen gas is a ferritic steel alloy containing a percentage by weight of Cr of 12 to 30% and an Al content of 1 to 8%.

11. The process according to claim 7, in which the alloy in contact with the oxygen gas, for an oxygen temperature not exceeding 500° C., is an alloy containing a percentage by weight of chromium in the range of between 10 and 20% by weight.

12. The process according to claim 7, in which the alloy has a Ni content higher than 25% and a Cr content from 10 to 30%.

13. The process according to claim 12, in which the alloy is one of those commercially available under the names "Inconel 600 H", "600L", "601", "617", "625", "Incoloy 800H" or "800HT".

14. The process according to claim 13, further comprising bringing elements in the heat exchanger in contact with the oxygen gas to a temperature in the range of between 300° and 900° C.

15. The process according to claim 7, in which the alloy complies with the condition of a weight gain of less than 0.1 mg/cm$^2$ of exposed surface when the phase temperature reaches at least 600° C. and the oxidising atmosphere exceeds 80% oxygen.

16. The process according to claim 7, in which the alloy complies with the condition of a weight gain of less than 0.1 mg/cm$^2$ of exposed surface when the phase temperature is at least 650° C. in oxidising atmosphere.

17. The process according to claim 3, further comprising:
placing an oxygen detector in contact with the heat transfer gas, and
connecting the oxygen detector to an alarm when the oxygen content is more than 1% higher than that of the heat transfer gas.

18. The process according to claim 1, wherein a power exchanged in the second heat exchanger to heat the oxygen gas is in a range of between 40 and 250 kW.

19. The process according to claim 1, wherein a power exchanged in the second heat exchanger to heat the oxygen gas is in a range of between 80 and 170 kW.

20. The process according to claim 1, further comprising maintaining a pressure of the oxygen gas in the second heat exchanger below 2 bar.

21. The process according to claim 1, where the heated oxygen gas at the outlet is at a temperature of not less than 400° C.

22. The process according to claim 1, further comprising and each burner consuming heated oxygen at a rate of between 200 to 1200 Nm$^3$ per hour.

23. The process according to claim 1, further comprising heating the heat transfer gas to between 450° C. and 1000° C.

24. A process for supplying gas to one or more burners of a glass melting furnace, comprising:
effecting a first heat exchange with combustion gas from the melting furnace with an intermediate heat transfer gas to form a heated heat transfer gas, wherein the heat transfer gas is formed by a gas that is inert with respect to oxygen;
passing the heated heat transfer gas to a heat exchanger having an outlet,
supplying oxygen gas comprising oxygen or a gaseous mixture comprising at least 50% oxygen to the heat exchanger;
effecting a second heat exchange by heating the oxygen gas in the heat exchanger via the heat transfer gas to a temperature at the outlet of the heat exchanger of not less than 300° C. to form heated oxygen gas;
supplying the heated oxygen gas from the outlet to one or more burners of the glass melting furnace;
each burner generating from 1 to 6 MW in the furnace,
exchanging a power per unit area in contact with the oxygen or gas rich in oxygen in the second heat exchanger in the range of between 5 and 15 W/m$^2$,
circulating gas in the tubes carrying the oxygen gas at a rate that does not exceed 120 m/s at any point in the second heat exchanger;
exchanging power in the second heat exchanger to heat the oxygen gas in a range of between 20 and 300 kW, and
maintaining a pressure of the oxygen gas in the second heat exchanger below 3 bar,
wherein both the first and second heat exchanges are indirect heat exchanges, and
wherein surfaces of the second heat exchanger contacting the oxygen gas are polished to have a roughness that does not exceed 6 μm.

25. The process according to claim 24, in which the heat transfer gas is air, nitrogen, $CO_2$ or steam.

26. The process according to claim 24, in which the heat transfer gas is formed from combustion gases diluted by means of at least one of the gases: air, nitrogen, $CO_2$ and steam.

27. The process according to claim 24, further comprising:
   heating the heat transfer gas in a recuperator, which has been heated by the combustion gases beforehand.

28. The process according to claim 24, further comprising maintaining a pressure of the oxygen gas in the second heat exchanger below 2 bar.

\* \* \* \* \*